Feb. 19, 1963 W. DROST ET AL 3,077,752
METHOD OF MAKING SYNTHETIC UNICRYSTALLINE BODIES
Filed July 19, 1957

INVENTORS
WILFRED DROST
RICHARD W. KEBLER
ELMER E. DUTCHESS
BY Thomas J. O'Brien
ATTORNEY

United States Patent Office 3,077,752
Patented Feb. 19, 1963

3,077,752
METHOD OF MAKING SYNTHETIC
UNICRYSTALLINE BODIES
Wilfred Drost, Williamsville, N.Y., Richard W. Kebler, Speedway, Ind., and Elmer E. Dutchess, Buffalo, N.Y., assignors to Union Carbide Corporation, a corporation of New York
Filed July 19, 1957, Ser. No. 673,070
5 Claims. (Cl. 65—18)

This invention concerns improved synthetic unicrystalline bodies, for example, unicrystalline corundum bodies, and improved methods for making such bodies.

Sapphire or corundum and other gem materials possess certain properties which render them especially valuable for many purposes in addition to their value for ornamentation. Sapphire, for example, is non-porous which makes it desirable for high vacuum systems. It has good mechanical strength at high temperatures, and possesses chemical stability whereby its properties do not change with time. Sapphire also possesses the ability for transmitting infra-red radiation, and it also has low microwave transmission losses which renders it valuable in micro-wave equipment, such as for example, magnetrons and klystrons. However, its use in such systems has been limited by size and shapes in which unicrystalline bodies can be made available by known processes.

Synthetic sapphire and other materials, such as rutile and spinel, are generally produced from boules grown by fusing and accumulating an appropriate material on a support which underlies an oxy-hydrogen flame and is progressively moved away from such flame as the boule grows in order to maintain a proper relationship between the upper surface of the boule and the flame. As obtained by this process, which is well-known as the Verneuil process, the boule is generally cylindrical in form and usually not more than one inch in diameter. Although boules may be grown in this manner which approach or even somewhat exceed one inch in diameter, the cracking and splitting losses during growth and annealing are so great as to make the process uneconomical for the fabrication of special large shapes. Such rupture is believed to result from the super-position of the thermal stresses undergone during cooling upon the stresses resulting from the thermal gradients in the boule during growth. The larger the boule diameter, the greater the combined stresses. Consequently, synthetic unicrystalline bodies heretofore available commonly had to be cut from these small diameter boules and did not exceed about 1" in diameter or width. Moreover, fabrication of a rectilinear window from the cylindrical boule is expensive and wasteful as a result of the necessary cutting operations. It is therefore the purpose of this invention to provide an improvement on the Verneuil process for growing synthetic gem bodies which overcomes the restrictive size and shape limitations in known boule-growing methods and which enables boules to be grown in shapes adapted for more efficient fabrication into desired pieces.

A specific object of this invention is to provide a process for growing rectilinearly-shaped sapphire boules suitable, for example, for use in the production of microwave transmission windows. Another object of this invention is to provide a process for growing unicrystalline boules in the form of shaped sheets which also can be used as infra-red transmission windows.

According to the present invention, powdered constituents of a unicrystalline body to be formed are passed through an oxy-hydrogen flame or other suitable sources of heat to fuse the constituents. The fused constituents are accumulated and crystallized on a crystal seed, preferably in rod form, which underlies the flame, and which also preferably has compatible lattice parameters and the same crystal structure as the crystal to be formed. The crystal seed is reciprocated on a line substantially normal to the direction of the flame and may be progressively lowered as the boule is grown so as to maintain a relatively constant distance between the flame and the point of deposition on the crystal seed.

Under proper furnace design and operating conditions wherein heat leak is minimized, the seed rod need not be lowered to maintain a relatively constant distance between the heat source and the molten growing surface. The boule is thus allowed to grow up toward the heat source. (This will cause a broadening of the growth zone, for example a sheet boule will have the shape of a prism.)

It is preferable that the reciprocation rate be sufficiently high to minimize the temperature gradients across the width of the boule as it is being grown, in order to avoid severe internal stress which will tend to crack larger size crystals. The rate of reciprocation is not otherwise critical, and the preferred rate will depend on other conditions; for example, the rate will be proportional to the length of the reciprocation stroke, and the permissible length of the stroke will be also related to the particular flame pattern used, i.e., for example elongating the flame pattern along the line of reciprocation permits lengthening of the stroke. The critical factor is the period of time when a particular point on the growing surface is not under the flame. This time must be such that a particular spot on the boule passes through the flame and then is returned to the flame still in an essentially molten condition.

The final shape of the as-grown boule will be determined primarily by the reciprocation motion applied to the seed rod during growth. A rectilinear boule will be prepared by reciprocation in a straight line. A curved sheet boule can be prepared by reciprocation along a curved line.

The principles of this invention will be described in detail hereinafter with reference to the accompanying drawings wherein.

Figure 1:
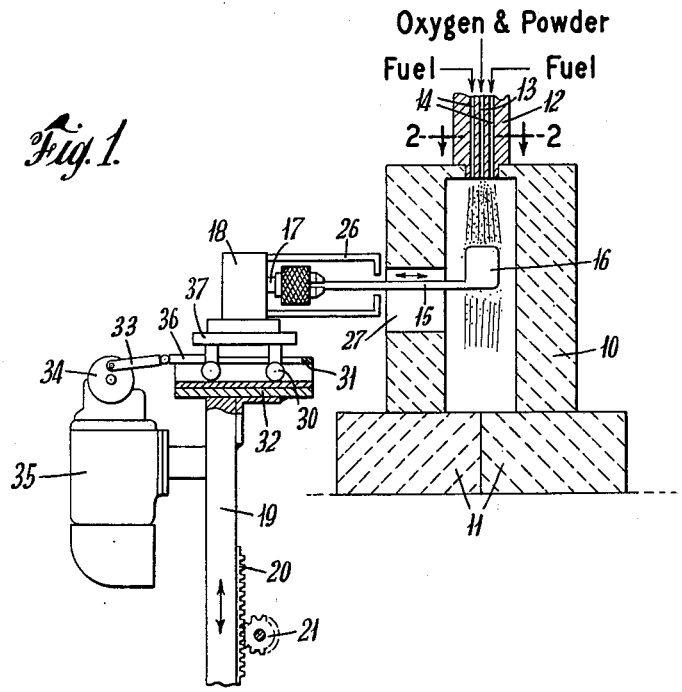
FIGURE 1 is a schematic view of one form of apparatus of carrying out the process presently mentioned.

With reference now to FIGURE 1 of the drawings, there is shown a small furnace 10 of heat-resistant material, which rests on blocks 11 of like material that close the lower end of the furnace. An opening in the upper end of the furnace receives the nozzle end of an oxy-hydrogen burner 12. The burner 12 is of the type known in the art as a "tri-cone" burner. Oxygen is supplied continuously through central passage 13, and powdered material, such as crystallizable alumina powder, for example, is delivered in known manner through passage 13 by the oxygen stream. Fuel gas, such as hydrogen, is delivered to the nozzle end of burner 12 through a plurality of passages 14 surrounding central passage 13. Additional oxygen is delivered through passages 22 also surrounding the central passage 13. The oxygen and hydrogen mix together outside the burner and upon ignition form an intensely hot downwardly directed flame which fuses the powder passing therethrough as well as fusing the growing surface.

In accordance with the principles of this invention, a crystal seed 15, preferably in the form of a rod as shown, is mounted for reciprocation along a horizontal line in such a manner that its free end extends through an opening 27 in the side wall of the furnace 10 with its tip 16 disposed in a position underlying the flame emanating from burner 12, the seed rod holder assembly being movable vertically so that as the height of the boule increases, the rod may be moved progressively downward to maintain a suitable distance between the upper edge of the boule and the burner nozzle. Conversely it can be readily seen that the burner may be moved relative to the seed rod, and that any relative movement of the two elements can be made to effect the desired condition. This lowering procedure is not an essential part of the invention, however.

The seed holder assembly comprises a gripping arm 17 supported in a vertically movable housing 18, which may be supported, for example, on an upright 19 that has a rack 20 which is secured thereto and which is driven by a pinion 21 to move the assembly upwards and downwards. The seed rod housing 18 is slidably supported on runners 30 in a groove track 31 carried on a platform 32. The bearing housing is reciprocated by a motor 35 that is connected to such housing through a wheel 34, driven by said motor, and a connecting rod 33 mounted at one end eccentrically on the wheel 34 and pivotally connected at its other end to a rod 36 fixed to a carriage 37 supporting the housing 18 on runners 30. This type of furnace and boule movement control affords a special advantage in controlling heat losses as compared to conventional type Verneuil furnaces. Here the furnace bottom is closed permanently, thus avoids updrafts, and heat leak through the side wall opening admitting the seed rod is minimized by a radiation shield 26.

As discussed above it is preferable that the reciprocation rate be as high as possible to minimize temperature gradients in the boule.

The crystallographic orientation of a crystal grown with the use of a reciprocating seed rod is a continuation of the crystallographic orientation of the seed rod, and therefore can be preselected by proper choice of the seed rod. For many purposes, it is desirable to have the crystallographic C-axis perpendicular to the large face of the as-grown sheet boule. This is the preferred orientation for minimum variation of the index of refraction for waves with different polarizations when the crystal is used as a window in infra-red systems. This orientation is obtained when the crystallographic C-axis is perpendicular to the burner axis and to the line of reciprocation. This orientation is also advantageous since the crystal boule in sheet form inherently has a tendency to grow with the C-axis so aligned. It has also been found that windows fabricated from sheet boules grown in this fashion have improved internal quality as compared with windows fabricated from prior art boules.

Figure 3:
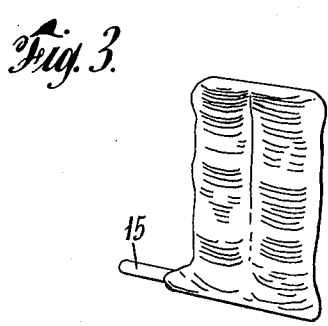
FIGURE 3 is an illustration showing the shape of the boule grown by the present process employing straight reciprocation.
Figure 2:
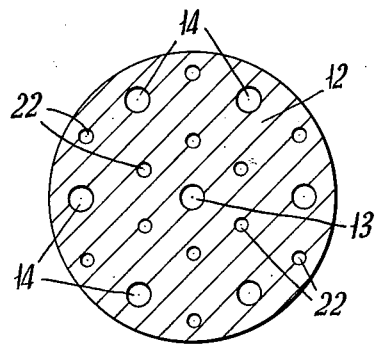
FIGURE 2 is a cross-section of the burner along line 2—2 shown in FIGURE 1.
Figure 4:
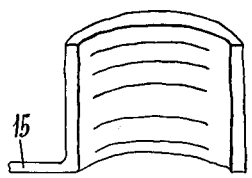
FIGURE 4 illustrates another unicrystalline body which can be grown by using reciprocating motion in an arcuate path of the seed rod during growth.

After an initial period of operation during which the flame is used only to fuse the surface of the seed rod, the powder feed is started. The powder dropping through the flame melts and accumulates in molten condition on the seed crystal, and crystallizes progressively as the operation is continued. Reciprocation of the seed rod results in a rectangularly-shaped crystal, such as shown in FIGURE 3. As the boule grows upwardly from the seed rod, the latter may be lowered to compensate for such growth in order to maintain a proper relationship between the molten edge of the crystal and the flame. This lowering is not required in every instance. The grown boules are subsequently annealed by slow heating to about 1900° C. in the case of sapphire, about 1600° C. in the case of rutile, in a gas-fired furnace. The boule is held at this temperature for several hours and is then slowly cooled.

By the present process, the crystal seed is positioned along one edge of the boule sheet and can be removed easily from the product if growth defects, such as inclusions, occur at the seed edge.

The following example serves to illustrate an application of this invention:

Growth of Sheet Sapphire Boule

An oxygen-hydrogen burner of the type typical of the Verneuil process for growing crystalline boules was used for this process. This burner consisted of oxygen and hydrogen ports surrounding an oxygen port through which boule powder was dropped. An 0.14 inch diameter sapphire seed rod having a crystal orientation of the optic axis 90° from the physical axis was positioned about 4½ inches below the burner outlet so that the optic axis of the crystal was perpendicular to the central axis of the burner and perpendicular to the direction of reciprocation. The seed rod was also positioned so that a portion of the rod was always under the powder orifice during boule growth. The growth zone was surrounded by two 2 inch I.D. furnace bricks chopped out to accommodate the growing boule. The seed rod was then horizontally reciprocated in harmonic motion at 40 strokes per minute at a stroke amplitude of ⅞ inch. The burner was ignited and the gas streams set at 40 c.f.h. for hydrogen, 10 c.f.h. for outer oxygen, and 2 c.f.h. for inner oxygen. The bricks were closed about the growth zone and the seed rod was allowed to warm for two minutes. Gradually and simultaneously over a one minute period, the hydrogen and outer oxygen flows were increased to 134 c.f.h. and 24 c.f.h. respectively. Then over a one minute period, the inner oxygen stream was increased until the seed rod began to melt. It was important that the working area of the seed remain essentially molten during any portion of the reciprocation stroke. Melting of the seed rod occurred at an inner oxygen flow of about 11 c.f.h. The powder feed was then started and adjusted so that the boule growth rate was about 130 carats per hour. Growth was then continued until a boule 2¼" high, 1⅜" wide, and ¼–⅜" thick with a weight of 330 carats was obtained. The powder feed was stopped, the gas flows suddenly shut off, and the reciprocation stopped. The as-grown boule was then allowed to cool in the growth furnace for at least an hour before removal. The boule product is shown in the accompanying FIGURE 3.

The method of this invention is applicable to other materials where elongated seed rods can be grown or where a seed crystal can be held on the end of a reciprocating rod of different material. For example, such materials as rutile and spinel may be grown by the method of this invention. The subject process is also not limited to the use of oxygen-hydrogen burner flames, but also could use other heat sources such as gases heated by an electric arc.

What is claimed is:

1. A process for growing a synthetic unicrystalline body which comprises passing powdered constituent material through a heat source to fuse the same; directing said heat source and powdered material entrained therein downward toward a seed crystal disposed above an axis substantially normal to the heat source for depositing fused material and building up such material by crystallization on the seed crystal; and reciprocating said seed crystal along a horizontal path transverse to the heat source while maintaining said seed crystal at all times above said axis to keep the deposited fused material on top of the said seed crystal to grow a body thereabove.

2. A process as defined in claim 1, wherein said rod is reciprocated in rectilinear motion.

3. A process as defined in claim 1, wherein said rod is reciprocated in an arcuate path lying in a plane substantially normal to the flame.

4. A process for growing a synthetic unicrystalline body which comprises passing powdered constituent material through a heat source to fuse the same; directing said heat source and powdered material entrained therein toward a seed crystal which has a crystal structure that is the same as the grown constituent material and lattice parameters compatible with those of the constituent material and which is disposed on an axis with an exposed area of said seed crystal substantially normal to the heat source for depositing fused material and building up said material by crystallization on the seed crystal; and reciprocating said seed crystal along said axis transverse to the heat source while maintaining said exposed area of said seed crystal at all times facing said heat source to permit fused powdered material to be deposited on the seed crystal to grow a body thereon.

5. A process as defined in claim 1 in which the seed crystal orientation is with the crystal C-axis perpendicular to the large face of the as-grown body.

References Cited in the file of this patent

UNITED STATES PATENTS

| | | |
|---|---|---|
| 1,869,163 | Niedergesass | July 26, 1932 |
| 1,930,327 | Thomson | Oct. 10, 1933 |
| 2,471,437 | Lester et al. | May 31, 1949 |
| 2,584,427 | Craston | Feb. 5, 1952 |
| 2,634,554 | Barnes | Apr. 14, 1953 |
| 2,852,890 | Drost et al. | Sept. 23, 1958 |
| 2,853,617 | Berreman | Sept. 23, 1958 |